Dec. 29, 1970

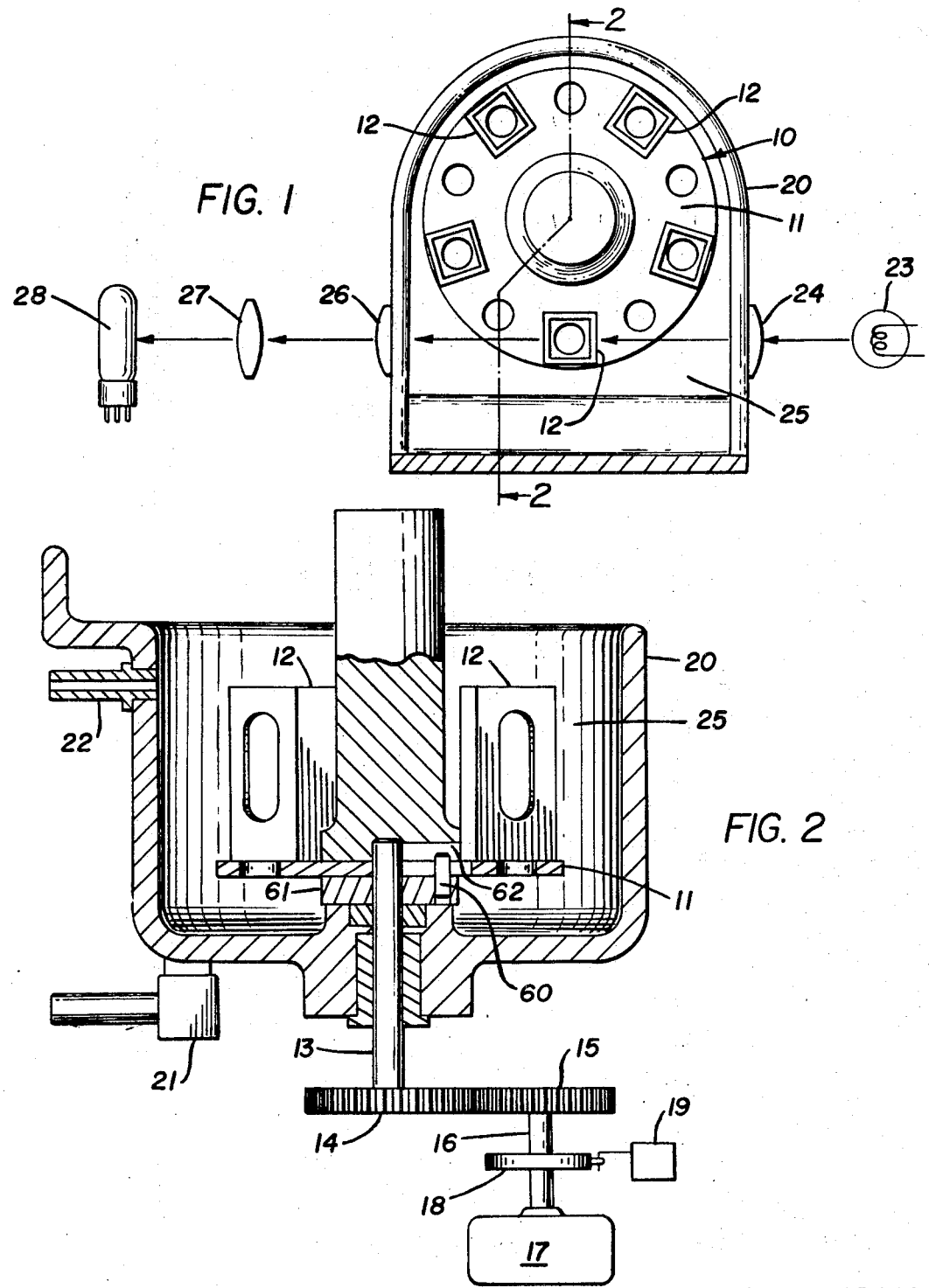

M. L. BROWN 3,551,062

MULTIPLE SAMPLING ACCESSORY FOR SPECTROPHOTOMETER

Filed July 18, 1967

MAURICE L. BROWN
INVENTOR.

BY Frank C. Parker

ATTORNEY

MAURICE L. BROWN
INVENTOR.

BY Frank C. Parker

ATTORNEY

United States Patent Office 3,551,062
Patented Dec. 29, 1970

3,551,062
MULTIPLE SAMPLING ACCESSORY FOR SPECTROPHOTOMETER
Maurice L. Brown, Victor, N.Y., assignor to Bausch & Lomb Incorporated, Rochester, N.Y., a corporation of New York
Filed July 18, 1967, Ser. No. 654,260
Int. Cl. G01n 1/10, 21/24
U.S. Cl. 356—246                            5 Claims

ABSTRACT OF THE DISCLOSURE

A test cell holder for a spectrophotometer that comprises a plurality of test cell retainers arranged in a carrousel fashion, each cell retainer containing an opening, in opposite sides, through which the contents of the test cell is generally viewed. The multiple cell holder rotates and indexes when used in a spectrophotometer thereby allowing the spectrophotometer to sample a plurality of test cells in a predetermined sequence.

BACKGROUND OF THE INVENTION (1) Field of the invention

This invention relates to sampling accessories generally and more particularly to a multiple sampling accessory for use in a spectrophotometer.

(2) Description of the prior art

The sampling of a test specimen in a spectrophotometer is often accomplished by inserting the test specimen, contained in a test cell, in an apparatus similar to that shown in the patent to Robertson, No. 2,744,440. In accessories such as this, provisions are sometimes made for multiple cells being inserted in a cell holder and linearly movable, by manual operation of a thumb screw. Such a system is oftentimes slow in operating and does not lend itself to automatic sampling and testing of specimens, since the operator is required to manually adjust the various specimens to be sampled in front of the viewing opening. In addition, because of the physical configuration of the accessory, only certain shape test cells could be sampled.

SUMMARY OF THE INVENTION

In order to overcome the problems inherent in the hereinbefore mentioned prior art sampling accessory, I have provided a new and novel apparatus whereby a plurality of test cells are retained in cell retainers attached to a base plate in a carrousel fashion. The cell retainers provided for in my invention will accommodate a square, rectangular or circular cross sectional test cell. In addition, the various shaped test cells may be intermixed in the sampling accessory by the new and novel means hereinafter described. Also provided are means for rotating the multiple cell holder and means for indexing the multiple cell holder whereby the cell holder may be rotated through a variety of predetermined positions to allow the spectrophotometer to sample a plurality of specimens in any predetermined sequence.

Accordingly, it is an object of my invention to provide a new and novel test cell holder for a spectrophotometer that allows a plurality of test cells to be sampled automatically and indexed to any position.

Another object of my invention is to provide a new and novel multiple test cell holder containing a plurality of individual test cell retainers of a general box-like shape that are capable of retaining rectangular, square, or circular cross-sectional shaped test cells in an upright position.

Still another object is to provide a multiple cell holder which may be used in a spectrophotometer to retain a plurality of various shaped test cells in an upright position in said spectrophotometer.

Yet another object of my invention is to provide a new and novel multiple cell holder wherein a test cell of circular cross-sectional area is held in a vertical position by means of a flexible insert consisting of three finger-like projections.

These and other objects and advantages will be found in the novel details of construction, combinations and arrangement of the parts of this invention by referring to the specification herebelow and the accompanying drawings.

BRIEF DESCRIPTION OF THE DRAWINGS

FIG. 1 is a top-sectional view showing my multiple sampling apparatus installed in a temperature controlled water bath of a spectrophotometer, FIG. 2 is an enlarged sectional view of the multiple sampling apparatus taken along line 2—2 of FIG. 1.

DESCRIPTION OF PREFERRED EMBODIMENT

Figure 3:
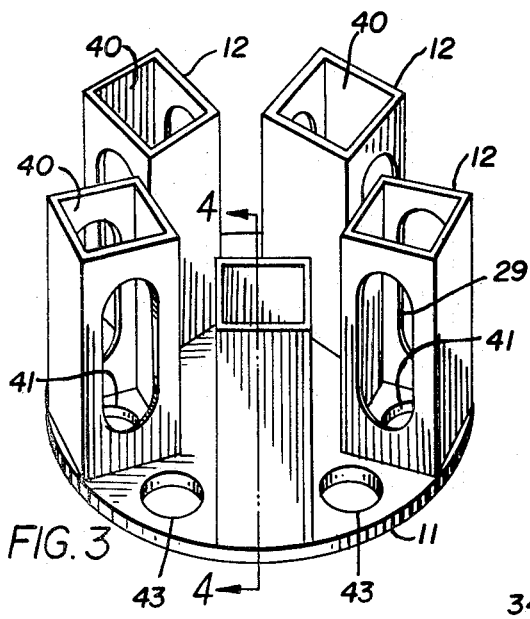
FIG. 3 is a general perspective view of a modification of the multiple sampling apparatus.

A multiple sampling apparatus 10 embodying my invention is shown in FIG. 1 of the drawing and comprises a circular disc 11 having attached thereto a plurality of test cell retainers 12, arranged in a circular manner around the periphery of the disc 11.

The multiple sampling apparatus 10 when used in a spectrophotometer may be rotatable by a shaft 13, as best seen in FIG. 2. The shaft 13 is coupled through a pair of gears 14 and 15 to the motor shaft 16 of a motor 17. A cam 18 rigidly fixed to the motor shaft 16 contains a plurality of indentations which actuate a micro switch 19 when the multiple sampling apparatus 10 is rotated by the motor 17. By the use of the multiple indentations on the cam 18 along with the micro switch 19, means are obtained whereby the multiple sampling apparatus may be rotated and stopped in a variety of predetermined positions, controllable by electrical circuitry, well known in the art, that operates the motor 17. As a result, the spectrophotometer is able to automatically sample a plurality of samples in any predetermined sequence desired.

The multiple sampling apparatus described may be used in a temperature-controlled water bath 25 adapted for a spectrophotometer which comprises an outer water tight compartment 20 and means for circulating a cooling liquid into, through and out of the outer compartment through fittings 21 and 22 in FIG. 2. In such a system, radiation from a generating means 23 is passed through a lens 24, the water bath 25, the test cell retainer 12 by means of two elongated openings formed in opposite sides of the cell retainer and the test cell with specimen, said radiation exiting through a lens 26 and a lens 27 to a photo-electric detection device 28, as shown in FIG. 1.

In FIG. 3, there is shown an embodiment of my invention whereby the multiple sampling apparatus may be utilized as a recepticle for a plurality of test cells. The plurality of test cell retainers 12 attached to the circular disc 11 may be removed from the spectrophotometer and used as a means for retaining a plurality of test cells in a vertical position for additional laboratory experiments or to store the specimen as a laboratory shelf. The test cell retainers 12 are constructed in such a manner as to allow light or radiation to pass through the retainer 12 by means of a pair of elongated holes 29 formed in the sides thereof.

Figure 4:
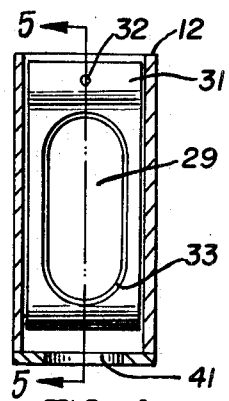
FIG. 4 is an enlarged section of a test cell retainer taken along line 4—4 of FIG. 3.
Figure 8:
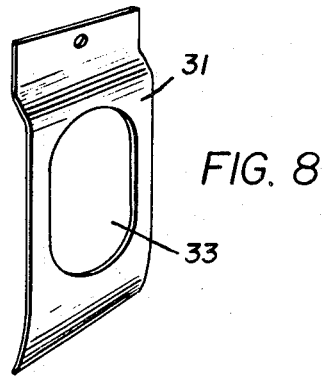
FIG. 8 is a general perspective view of the fixed spring clip utilized in the test cell retainer as shown in FIG. 4.
Figure 10:
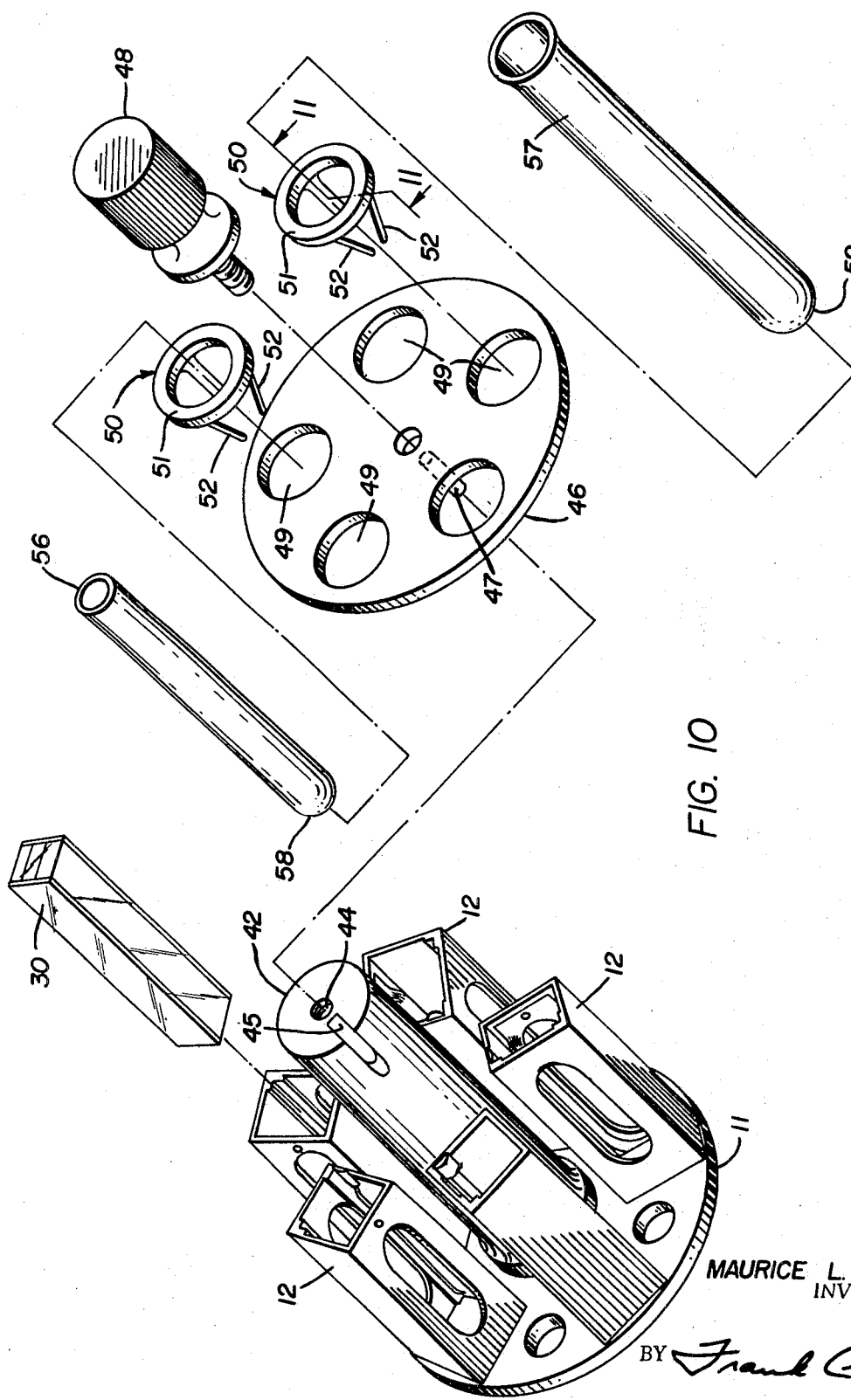
FIG. 10 is a general perspective exploded view showing another modification of the multiple sampling accessory.

When utilizing the test cell retainers with square or rectangular cross-sectional test cells 30, shown in FIG. 10, a series of spring clips fastened to the inside of the test cell retainers serve as the means for retaining the test cell in a vertically aligned position. One spring clip means 31, shown in FIG. 8, is permanently fastened on the inner wall of the test cell retainer 12 by means of a rivet 32, as shown in FIG. 4, and contains an elongated hole 33 somewhat larger than the elongated hole 29, but of the same general configuration.

Figure 6:
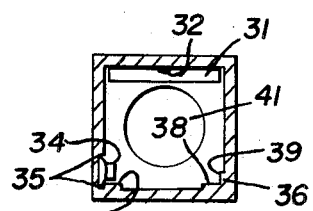
FIG. 6 is an enlarged top-sectional view of a test cell retainer taken along line 6—6 of FIG. 5.
Figure 7:
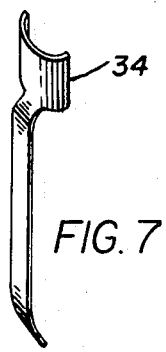
FIG. 7 is a general perspective view of the removable spring clip utilized in the test cell retainer shown in FIG. 5.

Another spring clip means 34, shown generally in FIG. 7, is removably attached to an adjacent inner wall of the test cell retainer 12 as shown in FIG. 6, by means of a pair of facing grooves 35 formed in the upper wall of the test cell retainer 12.

Formed on the opposite wall to the spring clip means 31 of the test cell retainer 12, is a protruding right angle 36 consisting of two legs 38 and 39 which serve as the means for automatically aligning the square or rectangular cross-sectional test cell 30 in the test cell retainer 12. Formed on the same wall as the leg 38 is a protruding surface 37 coplanar with the leg 38 of the angle 36. Whenever such a test cell 30 is inserted in the test cell retainer 12, the spring clip means 31 forces the edge of the test cell against the coplanar surfaces 37 and 38, while the spring clip means 34 forces the test cell 30 to ground against the leg 39 of the angle 36. As a result, the test cell 30 is held firmly and is accurately aligned in the test cell retainer 12 and, in addition, the test cell retainer 12 is able to accommodate a varying size of square or rectangular test cells 30 by means of the aforementioned use of the spring clip means 31 and 34, respectively.

It should be noted that the test cell retainers 12, in addition to defining an upper opening 40 through which the test cell is inserted into the test cell retainer 12 also define a lower opening 41, circular in configuration, which serves as a means to align a circular cross-section test cell which may be interchanged in the test cell retainer 12 as will be described hereinafter when referring to FIG. 10.

Figure 9:
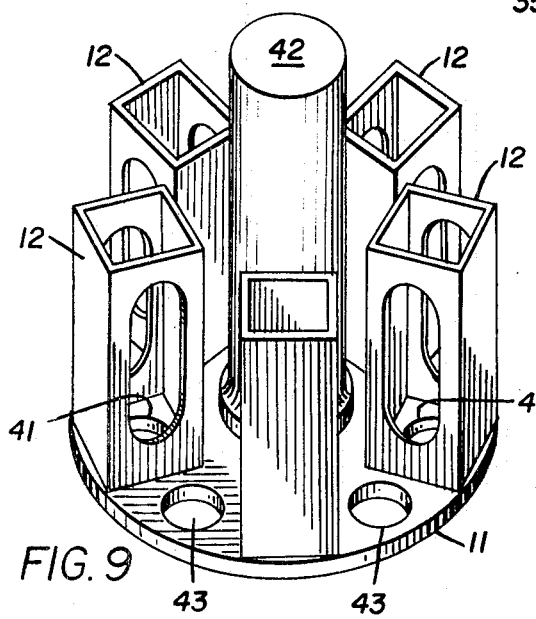
FIG. 9 is a general perspective view of a modification of the multiple sampling apparatus.

Turning to FIG. 9, there is shown a further embodiment of the multiple sampling accessory 10 consisting of an upright member 42 formed in the central portion of the circular disc 11 containing the plurality of test cell retainers 12. This upright member 42 may, for example, be cast as a one piece structure with the circular disc 11 or may be formed separately and rigidly fashioned to the circular disc 11 by any means well known in the art. By utilizing the upright member 42 in the manner shown in FIG. 9, it becomes readily apparent that the upright member 42 may serve as a central handle whereby the multiple sampling apparatus 10, containing a plurality of test cells retained in the test cell retainers 12, may be easily picked up and moved from position to position or removed from the spectrophotometer. In addition, the upright member 42 also serves as a means whereby a further modification hereinafter described may be made to the multiple sampling apparatus allowing intermixing of various shaped test cells.

It should be noted that the circular disc 11 of the multiple sampling apparatus 10 defines a plurality of holes 43 through the circular disc 11 in such a manner as to be interposed between the plurality of test cell retainers 12. These holes 43 permit the multiple sampling apparatus 10 to be quickly removed from a temperature controlled water bath by allowing the water above the holes 43 to drain through them and into the bath container. The plurality of holes 43, in addition to being interposed between the test cell retainers 12 are also formed through the circular disc 11, concentric with the lower opening 41 contained in the test cell retainers 12. The holes, formed in this manner, serve to retain a circular cross-sectional test cell in a vertical position as hereinafter described.

In FIG. 10, there is shown another embodiment of my invention, wherein the type of test cells utilized in the multiple sampling apparatus may be interchanged or mixed. In the modification shown in FIG. 10, the multiple sampling apparatus 10 with the upright member 42 attached has been adapted to use a variety of test cells by the drilling and tapping of a threaded hole 44 in the upper central portion of the upright member 42. In addition, the upper central portion of the upright member 42 carries a disc 46, the upright member 42 contains an alignment notch 45. To the upright member 42 is added a second circular disc 46, defining a plurality of holes therein, the number of holes equaling the number of test cell retainers 12 and being in exact registry therewith by means of alignment notch 45. Formed on the under side of the circular disc 46 is a dowel pin 47 which fits into the alignment notch 45 and is located in such a manner and is of such a size as to assure alignment of the holes contained in the circular disc 46 with the test cell retainers 12 contained on the circular disc 11 when the second circular disc 46 is rigidly fastened to the upright member 42 by means of a screw 48. The screw 48 also serves as a handle whereby the entire structure may be lifted and moved. It should be noted that the holes 49, formed in the second circular disc 46, should be of a size large enough to accommodate the passage of the largest square or rectangular cross-sectional test cell 30 when the test cells are intermixed in the multiple sampling accessory.

Figure 11:
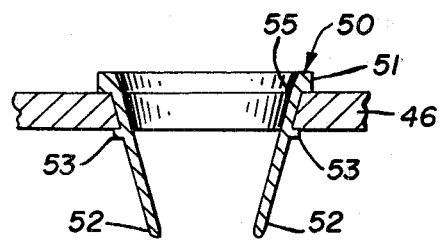
FIG. 11 is an enlarged sectional view taken along line 11—11 of FIG. 10 of a flexible insert used in my invention.

Formed separately and adapted to be inserted into the holes 49 are a plurality of flexible inserts 50, best seen in FIGS. 10 and 11. These inserts may be formed of plastic or some other suitable flexible material and are formed in a generally conical shape consisting of an upper vertical ring-like member 51 with at least three equally spaced finger-like members 52 attached thereto in a downwardly inclined manner. The general configuration of the flexible insert is shown in FIG. 11. Each of the downwardly inclined finger-like members 52 contain a protuberance 53, on the outside thereof, which is located a distance from the under surface of the upper ring-like member 51, generally equal to the thickness of the circular disc 46. In addition, the upper ring-like member 51 has an outside diameter larger than the holes 49 in the circular disc 46.

The inner diameter 55 of the upper ring-like member 51 is sized to a dimension somewhat larger than the largest circular shaped test cells to be used. From this it will be seen that accurate vertical alignment of a variety of circular cross-sectional test cells is achieved by means of the flexible fingers 52 protruding downwardly from the upper ring-like member 51. This is illustrated in FIG. 10, whereby the small circular shaped test cell 56 is held in place by the flexible insert 50 equally as well as the large test tube 57 being retained by another flexible insert 50 of the same size. It should also be noted that the square shaped test cell 30 may be used in this combination simply by removing the flexible insert 50 from the matching hole 49, said hole being large enough to accommodate the largest size square or rectangular test cell 30.

Figure 5:
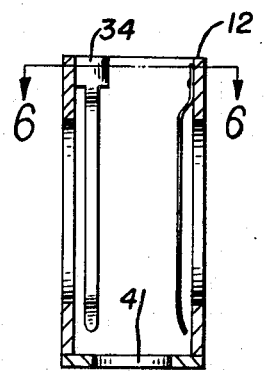
FIG. 5 is an enlarged view of a test cell retainer taken along line 5—5 of FIG. 4.

In order to complete the vertical alignment of a circular test cell, mention must be made at this time of the lower opening 41 formed in the test cell retainers 12, shown in FIGS. 4, 5, and 6, and to the holes 43 formed concentrically in the circular disc 11 with the holes 41. When using a circular shaped test cell, such as that shown by numerals 56 or 57, the holes 41 serve as a lower positioning means in which the hemispherical section 58 and 59 of the test cells 56 and 57 rest whenever the test cells are retained by the flexible insert 50 in a vertical position. From this it will be seen that by the combination of the flexible insert 50 with its finger-like protrusions 52 used in conjunction with the holes 41, a test cell of circular configuration, such as that shown by numeral 56 or 57, may be retained in accurate vertical alignment in the multiple sampling apparatus 10.

The multiple sampling apparatus 10 may be constructed as a permanent attachment in a spectrophotometer or may be adapted to be removably attached thereto. In the latter case, alignment of the multiple sampling apparatus 10 with the shaft 13 must be insured and incorporated into the device. Such alignment means are best shown and described in reference to FIG. 2 and consists generally of a dowel pin 60 rigidly fastened to a sleeve 61 formed on the shaft 13. The dowel pin 60 is fixed in such a position and is utilized to assure accurate alignment with a matching hole 62 formed in the circular disc 11. From this, it will be seen that the multiple sampling apparatus 10 may be quickly and easily detached from the watertight compartment 20 of the spectrophotometer in order to place new test cells into the test cell retainers 12 and may be quickly and accurately replaced and realigned in the spectrophotometer.

In the operation of my apparatus when utilized in a spectrophotometer, a plurality of test cells 30, 56 or 57 are placed in the test cell retainers 12. The plurality of test cells may be all of the same type or may be intermixed as hereinbefore described.

After the test cells are placed in their test cell retainers and are held vertically by means hereinbefore mentioned, the multiple sampling apparatus 10 is lifted by means of the screw 48 and placed in the spectrophotometer, the dowel pin 61 serving to align the same in the proper operative position. Should a temperature controlled water bath be desired when obtaining the sample readings, the water is then circulated into, around and out of the watertight chamber 25 by means of the inlet and outlet fittings 21 and 22.

After the spectrophotometer has sampled the first test cell by means of the photo-electric detection device 28, the multiple sampling apparatus 10 is rotated by the motor 17 and indexed to the next position by means of the cam 18 and the micro-switch 19. After an appropriate predetermined time the multiple sampling apparatus 10 is again rotated and indexed to allow the next test specimen to be sampled. By means of electrical circuitry well known in the art, this sequence may be repeated and varied by the operator of the spectrophotometer to suit his needs.

From the foregoing, I have provided a new and novel multiple sampling apparatus which may be used in a spectrophotometer with or without a temperature controlled water bath. The multiple sampling apparatus of my invention is adaptable to receive a plurality of test cells of any square, rectangular or circular cross-sectional configuration which may be utilized in the multiple sampling apparatus. In addition, as a result of my invention, the plurality of test cells may be intermixed thereby allowing a spectrophotometer to sample a plurality of test samples contained in a variety of test cells.

In addition, to the above, it should be apparent that I have also provided a new and novel alignment method in my multiple sampling apparatus whereby the test cells, regardless of their configuration may be quickly and accurately vertically aligned in the multiple sampling apparatus 10.

Finally, it should be noted that my multiple sampling apparatus, by means of its new and novel configuration, may be utilized simply as a test cell retainer to retain a plurality of test cells in a vertical position. By the use of my multiple sampling apparatus in this manner a plurality of test cells may be stored on a laboratory shelf in some approved manner and then placed in a spectrophotometer for sampling of the specimen contained in the test cells.

While only certain forms of the present invention are shown and described herein in detail, other forms and modifications are possible and changes may be made in the arrangement and combination of the parts of my invention and in the detailed structure without departing from the spirit and scope of the invention as defined in the claims herein appended.

I claim:

1. A flexible insert for use in a test cell holder comprising a generally conical-shaped structure having an upper vertical ring-like member and at least three substantially straight and equally spaced finger-like members attached thereto in a downwardly inclined inwardly directed manner for engaging a test cell about its laterally disposed periphery thereby forming the generally conical-shaped structure.

2. A flexible insert for use in a test cell holder of the type comprising a base member, a plurality of test cell retainers fixedly attached thereto, an upright member attached to said base member and a plate member fixedly attached to said upright member, the improvement comprising, a generally conical-shaped flexible insert for receiving and optically aligning a test cell relative to said base member, said insert having an upper vertical ring-like member and at least three substantially straight and equally spaced finger-like members attached thereto in a downwardly inclined inwardly directed manner for engaging a test cell about its laterally disposed periphery, each finger-like member containing a protuberance on the outside thereof located a distance from the upper ring-like member generally equal to the thickness of the plate member.

3. In a test cell holder for carrying a plurality of individual test cells in an upright position, the improvement, comprising:
   a multiple test cell holder having a base member carrying a plurality of individual test cell retainers disposed for forming a circular pattern, each test cell retainer defining a first hole in the bottom thereof in concentric alignment with a second hole formed in the base member, each test cell retainer having a pair of spring clips fixedly attached to adjacent interior walls of each test cell retainer for aligning a test cell substantially transversely to the base member,
   an upright member affixed to said base member,
   a plate member affixed to said upright member defining a plurality of openings, the number of openings equaling the number of test cell retainers carried by the base member and in registration therewith, and
   a plurality of removable flexible inserts located in the openings in the plate member, each flexible insert comprising a generally conical-shaped structure having an upper vertical ring-like member with at least three substantially straight and equally spaced finger-like members attached thereto in a downwardly inclined inwardly directed manner for engaging a test cell about its laterally disposed periphery for aligning the test cell substantially transversely to the base member, each finger-like member containing a protuberance located on the outer surface thereof at a distance from the upper ring-like member generally equal to the thickness of the plate member, said protuberance serving as means for retaining each flexible insert in its respective opening in the plate member.

4. In a test cell holder for a spectrophotometer, comprising a test cell retainer having an upper opening through which a test cell may be placed and a pair of openings extending through opposite sides of the test cell retainer, said pair of openings serving as the means whereby a light beam from the spectrophotometer is directed through the test cell retained in the test cell retainer, the improvement comprising:

a multiple test cell holder having a base member carrying a plurality of the test cell retainers arranged in a circular manner on said base member, further characterized by said base member defining a plurality of positioning holes, an upright member and a plate member fixedly attached to said upright member and having a plurality of openings formed therein, the number of openings and holes equaling the number of test cell retainers carried by the base member and in registration therewith;

a removable flexible insert in each of said plurality of openings formed in the plate member for optically aligning a test cell with the light beam from the spectrophotometer;

electromechanical means for rotating said multiple test cell holder; and electromechanical means for indexing said multiple test cell holder whereby said test cell holder carrying a plurality of the test cell retainers is rotatable and indexable to a variety of predetermined positions thereby allowing the spectrophotometer to sample the plurality of test cells in a predetermined sequence.

5. A test cell holder as defined in claim 4 wherein the removable flexible insert in each of said plurality of openings formed in the plate member for receiving and optically aligning a test cell relative to said base member comprises a general conical shaped configuration having an upper vertical ring-like member with at least three substantially straight and equally spaced finger-like members attached thereto in a downwardly inclined inwardly directed manner, said finger-like members also containing a protuberance on the outside thereof located a distance from the upper ring-like member generally equal to the thickness of the plate member and serving as the means of retaining the flexible inserts in the openings in the plate member.

References Cited
UNITED STATES PATENTS

| | | | |
|---|---|---|---|
| 1,980,930 | 11/1934 | Reyniers | 211—74 |
| 2,436,145 | 2/1948 | Johnson | 356—103 |
| 2,723,037 | 11/1955 | Matesic | 211—74 |
| 2,956,686 | 10/1960 | Garby | 211—74 |
| 3,026,764 | 3/1962 | Allen et al. | 356—104 |
| 3,186,556 | 6/1965 | Forsstrom | 211—74 |
| 3,322,956 | 5/1967 | Shah | 250—218 |
| 3,375,934 | 4/1968 | Bates | 211—74X |
| 3,390,783 | 5/1966 | Quackenbush, Jr. | 211—74X |
| 2,999,417 | 9/1961 | Isreeli | 356—246X |

FOREIGN PATENTS

| | | | |
|---|---|---|---|
| 1,353,373 | 1/1964 | France | 356—244 |

OTHER REFERENCES

"Scientific Apparatus and Reagents," Thomas Company catalog, p. 954, Apr. 3, 1961.

McNiven et al., "Automation of Infrared Spectrometry," Anal. Chem. 37 (6), May 1965, pp. 778–9.

Fisher brochure on "Clinical Colorimeters," 1963, cover page and p. 2.

Willard et al., "Instrumental Methods of Analysis," 4th ed., D. Van Nostrand Co., New York (1965), pp. 382–3.

RONALD L. WIBERT, Primary Examiner

R. J. WEBSTER, Assistant Examiner

U.S. Cl. X.R.

250—218; 211—60, 69.5, 74; 16—2; 356—244

UNITED STATES PATENT OFFICE
CERTIFICATE OF CORRECTION

Patent No. 3,551,062   Dated December 29, 1970

Inventor(s) Maurice L. Brown

It is certified that error appears in the above-identified patent and that said Letters Patent are hereby corrected as shown below:

Col. 4, line 20, change "drilling and tapping" to -- forming lines 23-25, after "46" delete --,the upright member contains an alignment notch 45. To the upright member 42 is added a second circular disc 46, --

Signed and sealed this 1st day of June 1971.

(SEAL)
Attest:

EDWARD M.FLETCHER,JR.
Attesting Officer

WILLIAM E. SCHUYLER, JR.
Commissioner of Patents